Figure 5:
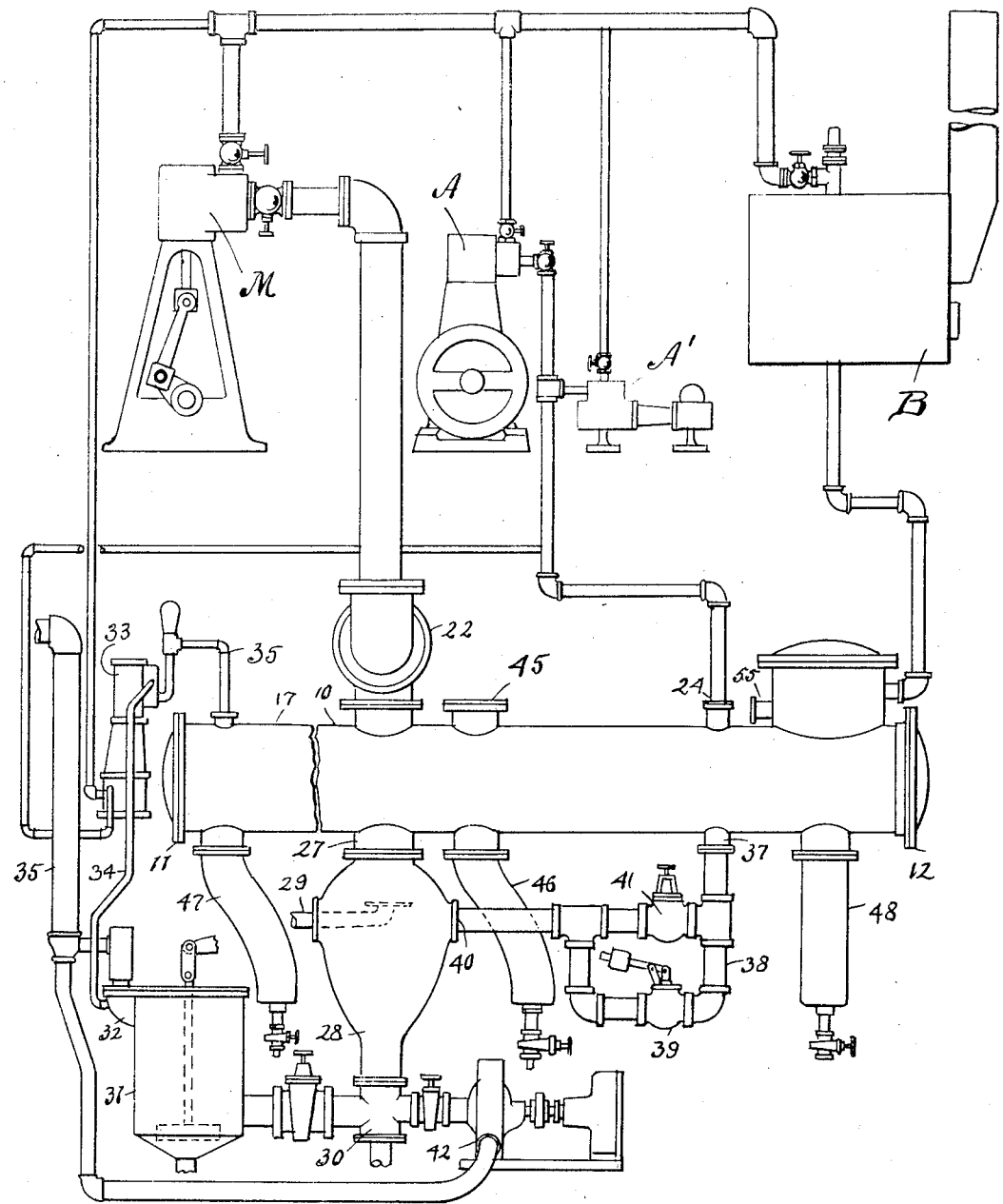

Nov. 20, 1928.  1,692,020
A. J. ARMSON
EXHAUST TREATING APPARATUS FOR STEAM POWER PLANTS
Filed July 20, 1925   3 Sheets-Sheet 1
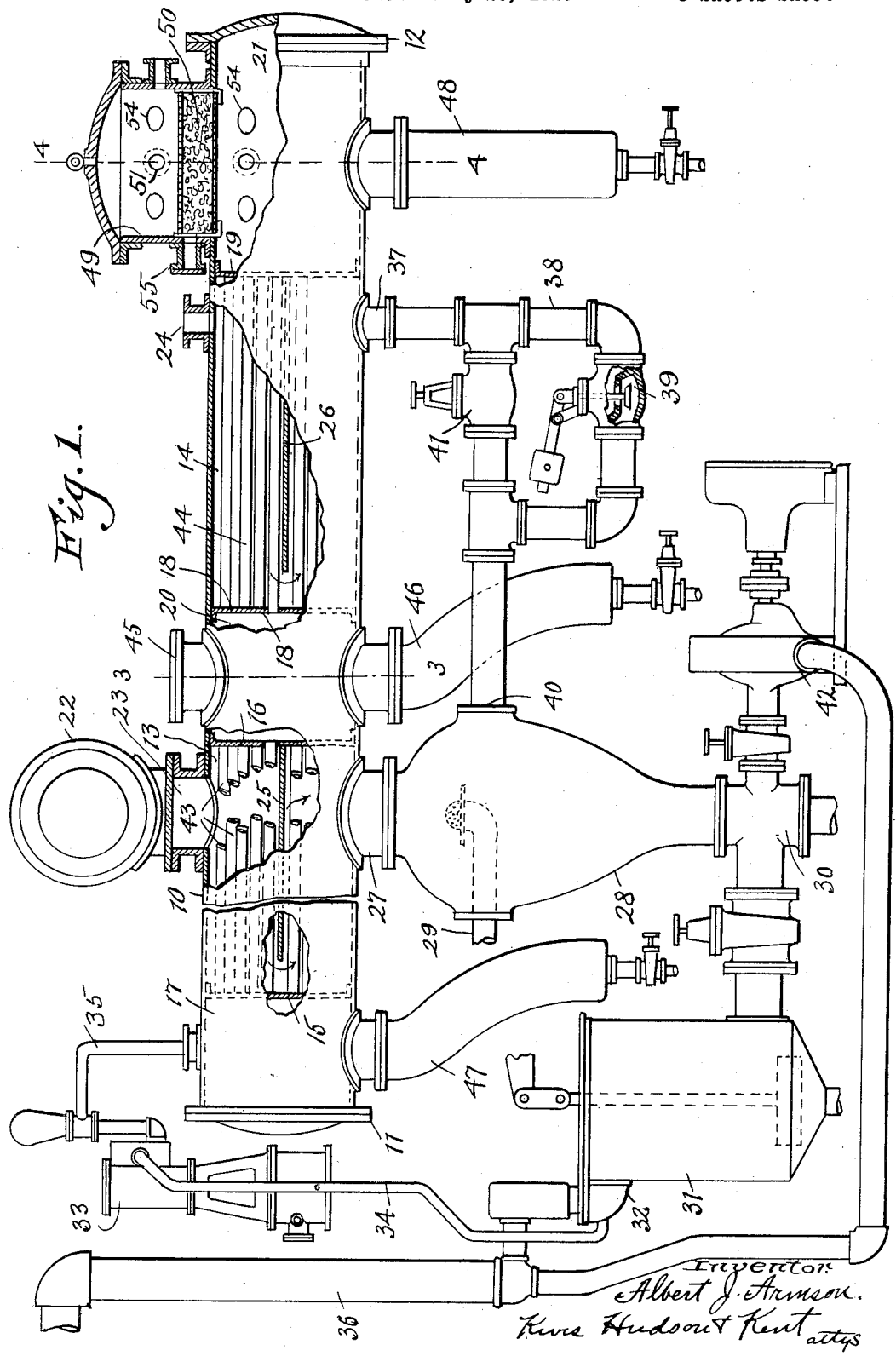

Nov. 20, 1928.　　　　　　　　　　　　　　　1,692,020
A. J. ARMSON
EXHAUST TREATING APPARATUS FOR STEAM POWER PLANTS
Filed July 20, 1925　　　　3 Sheets-Sheet 2
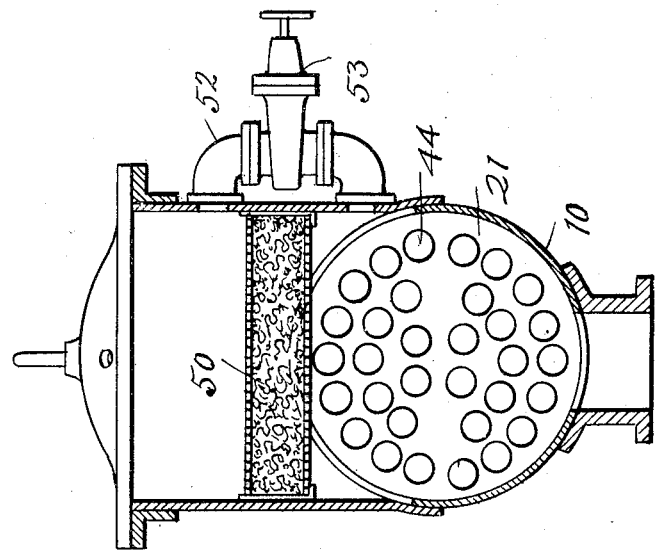
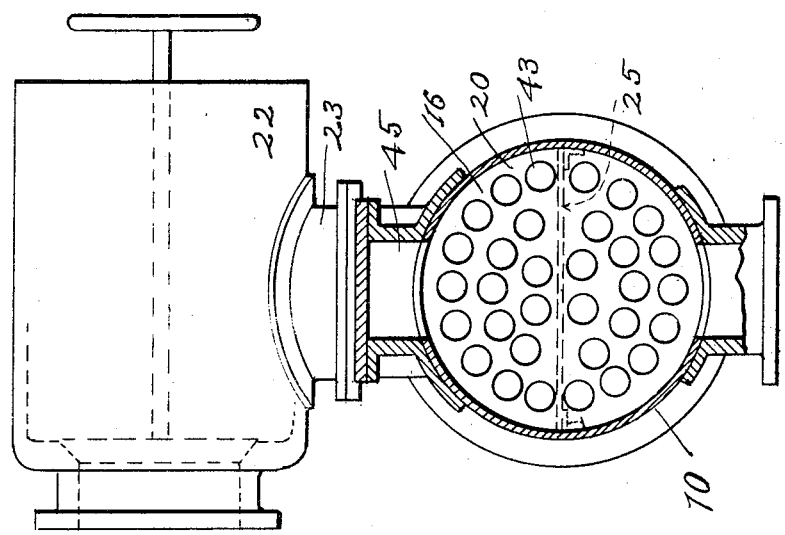
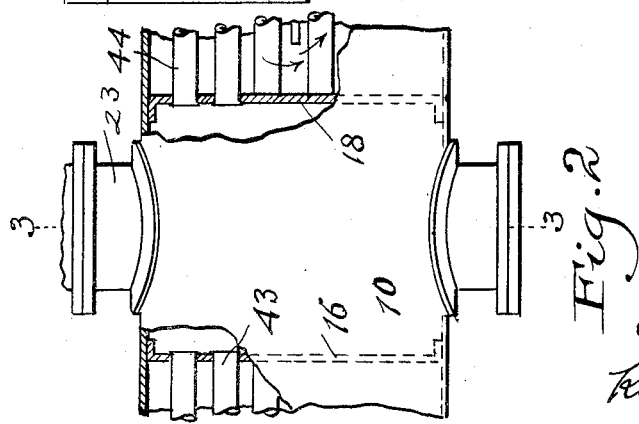

Patented Nov. 20, 1928.

1,692,020

UNITED STATES PATENT OFFICE.

ALBERT J. ARMSON, OF PORT HURON, MICHIGAN, ASSIGNOR TO THE ARMSON EXHAUST HEATING COMPANY, OF CLEVELAND, OHIO, A CORPORATION OF OHIO.

EXHAUST-TREATING APPARATUS FOR STEAM-POWER PLANTS.

Application filed July 20, 1925. Serial No. 44,713.

This invention relates to exhaust treating apparatus for steam power plants such as are employed on steamboats, especially those plying fresh water lakes as the Great Lakes, plants of this kind having a main engine for propelling the boat and a large number of auxiliary engines.

More particularly the present invention is an improvement over the exhaust treating apparatus shown and described in my prior applications, Serial No. 613,932, filed January 20, 1923, and Serial No. 15,672, filed March 14, 1925.

As explained in my first application above referred to, in steam plants on boats such as those plying the Great Lakes, it has been customary to lead exhaust steam from the main engine direct to a jet condenser and to pump the boiler feed water from a well into which the condenser water is pumped and to heat the feed water by the exhaust steam from the auxiliary engines, this exhaust steam after being passed through the heater being discharged to atmosphere.

By the apparatus constituting the subject matter of my applications above referred to, certain economies are effected by utilizing the exhaust from both the main and auxiliary engines for heating the feed water supplied to the boilers. This is accomplished by passing the steam from the main and auxiliary engines through a drum having longitudinally extending pipes through which the feed water is passed, the drum being connected to a condenser and the feed water being supplied to the inlet end of the drum from this condenser. With this apparatus both the main and auxiliary engines are operated as condensing engines as long as the exhaust from both types of engines is utilized in heating the feed water.

By the apparatus of the second of my applications above referred to, further economies are effected and the feed water is heated to a higher temperature by passing the feed water successively through two chambers, preferably forming separate compartments of the drum, and by passing the exhaust steam from the main engine through one chamber and then to the condensing means, and the exhaust steam from the auxiliary engines through the second chamber. The outlet from the second chamber through which the steam is led from this chamber, is also connected to the condensing means, but through a back-pressure valve which maintains the steam in the chamber at the same pressure as though the steam were discharged from the auxiliary engines to atmosphere, and consequently the steam in the second chamber being above atmospheric pressure is at a considerably higher temperature than the steam heating the feed water in the first chamber. This results in two stages of heating, the temperature of the feed water being elevated in the first chamber and raised still further in the second chamber. At the end of the second chamber, or at the outlet end of the drum a settling chamber is provided, and after the feed water is led or conducted from the tubes of the second chamber it passes under a vertical baffle over the settling chamber and is then conducted by a suitable outlet pipe to the boilers.

The exhaust treating apparatus constituting the subject matter of the present invention has all the advantages of the apparatus described in my prior applications, and certain important advantages, the main object being to effect further economies in the heating of the feed water, to obtain a better deposit or removal of sediment or impurities before the water is supplied to the boilers, and to obtain important structural advantages by a construction and arrangement which admit of the use of shorter tubes, and permit them to be mounted in supporting headers, and fastened in place by the usual beading and flanging method, and which admit of free access to the tubes for replacement or repairs.

In accordance with the present invention, two feed water heating chambers are employed, one receiving the exhaust steam from the main engine under condensing conditions, and the other receiving the exhaust steam from the auxiliary engines under non-condensing conditions as in my second application. These chambers may be, and preferably are formed in the same drum, the feed water being passed successively through them,—first through the chamber receiving the exhaust steam from the main engine, and then through the chamber receiving the exhaust steam from the auxiliary engines, but in accordance with an important feature of the present invention, these chambers are separated by an intermediate chamber, the ends of which are formed by headers forming the adjacent ends of the two heating chambers, and in these headers the ends of the tubes are mounted and secured in place by the usual boiler tube practice, and without the necessity for special packing. This intermediate chamber has a man-hole attachment so that entrance can be had to the chamber for initially mounting the tubes in the headers, or for replacement or cleaning purposes, and in the preferred embodiment of the invention a settling chamber is attached to this intermediate chamber.

As a further improvement, settling chambers are attached to a chamber at the inlet end of the drum in advance of the front header of the first heating chamber, as well as to a chamber at the outlet end of the drum.

As a further improvement I provide a filter in this outlet compartment for use in conjunction with the settling chamber beneath it, the arrangement of the filter and settling chamber being such that they do not prevent access to the tubes of the adjacent heating chamber, while at the same time they are highly effective in removing sediment and clarifying the water.

The invention may be further briefly summarized as consisting in certain novel details of construction, and combinations and arrangements of parts which will be described in the specification and set forth in the appended claims.

In the accompanying sheets of drawings, Fig. 1 is a diagrammatic or conventional view of the apparatus in which my invention is embodied, certain parts being shown in section and other parts in elevation, but omitting such parts as the main and auxiliary engines and boilers which are not essential to an understanding of the invention; Fig. 2 is a slightly enlarged, fragmentary, longitudinal sectional view of the middle portion of the drum; Fig. 3 is a transverse sectional view substantially along the line 3—3 of Figs. 1 and 2; and Fig. 4 is a transverse sectional view substantially along the line 4—4 of Fig. 1. Fig. 5 is a diagrammatic view of the apparatus showing the relationship of the main engine, auxiliary engines and boiler with respect to the condenser embodying the present invention.

While I do not regard it essential that the feed water heating chambers or compartments and the associated chambers to which the settling chambers are attached be formed in one continuous element, that arrangement is preferred. Accordingly I employ a horizontal drum 10, closed at its ends by heads 11 and 12. In this drum are formed two feed water heating chambers 13 and 14, the chamber 13 being longer than the chamber 14 and being adapted to receive the exhaust steam from the main engine M while the chamber 14 receives the exhaust steam from the auxiliary engines A—A'. The ends of chamber 13 are formed by two headers 15 and 16, secured in place on the interior of drum 10, the header 15 being a suitable distance from the head 11 and forming with the latter an inlet chamber 17 for the feed water.

The ends of chamber 14 are formed by two headers 18 and 19, also secured on the interior of the drum. The two headers 16 and 18 are spaced apart forming the intermediate chamber 20, and the header 19 is spaced from the head 12, forming with the latter what may be termed the outlet chamber 21.

As in my second application referred to above, the steam from the main engine M is conducted by a pipe to the casing of a shut-off valve 22. The outlet from the cut-off valve 22 is connected at 23 to chamber 13 near header 16, and the exhaust from the auxiliary engines A—A' is conducted by a pipe to an inlet 24 of chamber 14 near header 19.

Extending diametrically through chamber 13 from header 16 to a point near header 15 is a horizontal partition 25 which requires the steam entering at 23 to pass in one direction through the upper part of chamber 13, and then in the opposite direction through the lower part.

Chamber 14 has a similar horizontal partition 26 which requires the steam from the auxiliary engines to take a like course through this chamber.

The condensing part of the apparatus, i. e. that part for the treatment of the steam after passing through the feed water heating chambers, is similar to that shown in my second application referred to, and will be described briefly as follows:—The lower part of chamber 13 has beneath the inlet 23, an outlet 27 connected to a condenser 28, in this instance a jet condenser, to which condensing water is supplied by a pipe 29.

At the bottom of the condenser is a fitting 30, and the water is conducted from this fitting by an air pump 31 to a chamber 32 from which the water is pumped by a feed water pump 33 by pipes 34 and 35 to the inlet chamber 17 at the left hand end of drum 10 as the same is viewed in Fig. 1. The balance of the water not required to be supplied to the boilers B flows overboard through piping designated as a whole by the reference character 36.

Chamber 14, which as before stated, receives the exhaust steam from the auxiliary engines, has an outlet 37 connected by piping 38 containing a back-pressure valve 39, to the condenser at 40, the back-pressure valve being by-passed by a shut-off valve 41 which is normally closed so that the steam will be maintained in chamber 14 while heating the feed water, under non-condensing conditions or under the same pressure as would prevail if the exhaust of the auxiliary engines were discharged to atmosphere. But when the vessel is in port and it is desired to operate the auxiliary engines at maximum efficiency, the shut-off valve 41 may be opened, in which event the auxiliary engines will be operated as condensing engines. Under such conditions the steam in chamber 14 will be at a lower pressure and at a lower temperature than when the apparatus is operating normally, and consequently the feed water will be heated to a less extent than normally, but under these conditions the main engine is not in operation and it is not so important that the feed water be heated to as high a temperature as during normal operation.

When the main engine is not in operation, in which event the air pump 31 is idle since it is operated by the main engine, the feed water is pumped from the fitting 30 by an auxiliary pump 42 which is normally idle.

Mounted in the headers 15 and 16 and extending through chamber 13 are a number of horizontal feed water pipes 43, these pipes connecting inlet chamber 17 to the intermediate chamber 20, and mounted in headers 18 and 19 are similar feed water pipes 44 connecting the intermediate chamber 20 to the outlet chamber 21. It will be understood that the feed water flows through the drum from one end to the other from inlet chamber 17 through tubes 43 of heating chamber 13, into intermediate chamber 20; then through the tubes 44 of chamber 14; and then into outlet chamber 21. As it passes through tubes 43, the temperature of the water is elevated by the exhaust steam from the main engine, and while in chamber 20 it loses practically no temperature, especially as the headers 16 and 18 are heated by being in contact with the steam. As the water passes through the tubes 44 of chamber 14 its temperature is elevated still further by the exhaust from the auxiliary engines, this exhaust steam being at a higher temperature than the exhaust steam in chamber 13, since the auxiliary engines are operating under non-condensing conditions and the pressure and therefore temperature of the steam in chamber 14 is higher than that in chamber 13.

There is a sufficient space between the headers 16 and 18 to permit the use of a man-hole and man-hole cover 45, so that a workman may enter the intermediate chamber 20 to either install or remove the feed water tubes 43 and 44, and since the heads 11 and 12 are removable, entrance can be had to the end chambers 17 and 21. The construction is such that the tubes can be mounted in the outer headers 15 and 19 and in the intermediate headers 16 and 18 by the usual beading and flanging process employed in boiler constructions, thus doing away with the necessity of special packing as would be required if the intermediate compartment 21 were not provided and a single header were utilized to separate the feed water heating chambers 13 and 14.

The advantages of this construction in permitting the use of relatively short tubes compared with those required in my prior applications, in ease of access for original installation or for removal of tubes as well as for cleaning purposes, and in the elimination of special packing which would otherwise be required in view of the differences of pressure in chambers 13 and 14, since that in chamber 13 is below atmospheric and that in chamber 14 above atmospheric, will be obvious.

The addition of the intermediate chamber 20 additionally enables me to make provision for removal of sediment from the feed water between the two stages of heating, by the application of a settling chamber 46 to the bottom of the intermediate chamber 20. Additionally I prefer to attach similar settling chambers 47 and 48 to the lower sides of the inlet and outlet chambers 17 and 21. Inasmuch as the velocity of the feed water while passing through the chambers 17, 20 and 21 is relatively slow, an excellent opportunity exists for the deposit of sediment. In practice the coarser particles are deposited in the first chamber 47. The finer particles and also some of the relatively coarse particles will be deposited in chamber 46, it being understood that the temperature of the water in chamber 20 is considerably above that in chamber 17, and therefore the conditions for the precipitation of sediment and other foreign particles is enhanced since the removal of foreign particles from heated water takes place more readily than from relatively cold water. Further sediment will collect in the final settling chamber 48, the temperature of the water in chamber 21 being still higher, and the conditions for the precipitation of foreign matter still further enhanced.

To still further insure the supplying of clean water to the boilers B, I provide immediately above settling chamber 48, and at the top of compartment 21, a filter chamber 49 at the base of which is a filter 50 which may contain any suitable filtering material, and through which the heated feed water passes upwardly to the upper part of the filter chamber, which has an outlet 51 to which a pipe is adapted to be connected leading to the boilers.

It is obvious that the major portion of the particles filtered out from the water will cling to the lower surface of the filter, at least temporarily, but such as detaches itself from the surface, and the foreign particles removed from the filter on cleaning the same, particularly by the application of steam or other medium under pressure from above, will find its way into the settling chamber 48 beneath.

The filter chamber is preferably provided with a by-pass 52, normally closed by a shut-off valve 53, this by-pass being employed to by-pass the feed water around the filter 50 in the event that the filter should become clogged to an extent sufficient to impede the free flow of feed water. The filter chamber may also be provided with normally closed hand-hole 54 arranged above and below the filter to facilitate cleaning or repairs, and it may be provided with an additional hand-hole 55 (Fig. 1) to permit the removal or change of filtering material without removing the head of the filter chamber.

It should be noted that while the lower settling chamber 48 and the filter are relatively arranged so as to obtain the best results in the way of removal of sediment and other foreign matter, nevertheless neither prevents free access to the ends of the tubes mounted in header 19 when the head 12 is removed.

The settling chambers being dead-ended, have no circulation within them; consequently the precipitate will tend to fall freely to the bottom without much tendency to cake or form hard crusts, as is common in apparatus where the collection occurs in more heated portions. There being no vanes or baffles in the settling chambers which require scrubbing or similar treatment for cleaning purposes, the cleaning of the settling chambers is accomplished by the simple process of blowing off through suitable valves arranged at the lower ends of these chambers. This is a feature of advantage in marine work, as it makes possible the proper care of the apparatus without delaying the operation of the vessel. By employing the several settling chambers at different points of the apparatus where the feed water is at different temperatures, and applying the filter at the point where the feed water leaves the apparatus and passes to the boilers, the major portion of impurities are separated by the gravity method, and in an easily removable manner, and reduces to a minimum the frequency of cleaning or renewal of the filter.

Finally it might be mentioned that by providing the two-stage feed water heater with the heating chambers and the end and intermediate chambers to which the settling chambers and filter are applied, all in one unitary structure or continuous device, in effect one piece of apparatus performs the functions of several, compactness is obtained to a high degree, and much piping and other sources of complication are eliminated, avoiding unnecessary loss of heat and gain in space, along with reduction in weight, all of which in marine work increases the useful load-carrying capacity of the vessel.

While I have shown the preferred construction or arrangement, I do not desire to be confined to the exact details or arrangements shown, as modifications may be made without departing from the spirit and scope of the invention, and I aim in my claims to cover all such modifications.

Having described my invention, I claim:

1. In combination in a steam power plant of the type having a main engine and a plurality of auxiliary engines adapted to be supplied with steam from boilers, means for heating feed water for the boilers from which the steam is supplied comprising two heating chambers and an intermediate chamber through which the feed water passes successively, the two heating chambers adapted to receive steam delivered from the main and auxiliary engines for heating the feed water.

2. In combination in a steam power plant of the type having a main engine and a plurality of auxiliary engines adapted to be supplied with steam from boilers, means for heating the feed water adapted to be supplied to the boilers comprising two heating chambers having feed water tubes extending therethrough and an intermediate chamber connecting them, and means for passing steam delivered from the main and auxiliary engines at different temperatures through the two heating chambers.

3. In a steam power plant of the type having a main engine and a plurality of auxiliary engines adapted to be supplied with steam from boilers, means for heating the feed water supplied to the boiler or boilers of the plant comprising two heating chambers and an intermediate chamber through which chambers the feed water passes successively, and means for passing steam delivered from the main and auxiliary engines through the two heating chambers, the intermediate chamber having a settling chamber applied thereto.

4. In a steam power plant of the type having a main engine and a plurality of auxiliary engines adapted to be supplied with steam from boilers, a feed water heating apparatus comprising two heating chambers with an intermediate settling compartment, and means for passing exhaust steam from the main engine through one heating chamber and the exhaust steam from the auxiliary engines through the other heating chamber.

5. In a steam power plant of the type having a main engine and a plurality of auxiliary engines adapted to be supplied with steam from boilers, a feed water heating apparatus comprising two heating chambers with an intermediate settling chamber, and means for passing exhaust steam from the main engine through one heating chamber and the exhaust steam from the auxiliary engines through the other heating chamber, the first under condensing conditions and the second under non-condensing conditions whereby the feed water is heated to a higher temperature in the second heating chamber.

6. In a steam power plant of the type having a main engine and a plurality of auxiliary engines adapted to be supplied with steam from boilers, a feed water heating apparatus comprising a drum having two heating chambers through which steam delivered from the main and auxiliary engines is adapted to be passed, and having auxiliary chambers at the ends and intermediate the heating chambers, the feed water passing successively through all said chambers.

7. In a steam power plant of the type having a main engine and a plurality of auxiliary engines adapted to be supplied with steam from boilers, a feed water heating apparatus comprising a drum having two heating chambers through which steam delivered from the main and auxiliary engines is adapted to be passed, and having auxiliary chambers at the ends and intermediate the heating chambers the feed water passing successively through all said chambers, and settling chambers connected to said auxiliary chambers.

8. In a steam power plant of the type having a main engine and a plurality of auxiliary engines adapted to be supplied with steam from boilers, a feed water heating apparatus comprising a drum having two heating chambers through which steam delivered from the main and auxiliary engines is adapted to be passed and provided with tubes for the flow of water therethrough, an intermediate chamber between said heating chambers and chambers at both ends of the drum, means for supplying feed water to be heated to one of said end chambers, and a feed water outlet at the other end chamber whereby the feed water passes successively through all said chambers.

9. In a power plant having main and auxiliary engines, a feed water heating apparatus comprising a drum having two heating chambers provided with water tubes extending therethrough and having an intermediate chamber to which access may be had, and end chambers to one of which feed water to be heated is supplied and from the other of which the feed water is supplied to the boiler, means for supplying exhaust steam from the main engine to one of said heating chambers under condensing conditions, and means for supplying exhaust steam from the auxiliary engines to the other heating chamber under non-condensing conditions.

10. In a power plant having main and auxiliary engines, a feed water heating apparatus comprising a drum having two heating chambers provided with water tubes extending therethrough and having an intermediate chamber to which access may be had, and end chambers to one of which feed water to be heated is supplied and from the other of which the feed water is supplied to the boiler, means for supplying exhaust steam from the main engine through one of said heating chambers under condensing conditions, and means for supplying exhaust steam from the auxiliary engines to the other heating chamber under non-condensing conditions, said intermediate and end chambers having settling chambers attached thereto.

11. In a steam power plant of the type having a main engine and a plurality of auxiliary engines adapted to be supplied with steam from boilers, a feed water heating apparatus comprising a drum provided with two heating chambers adapted to receive steam delivered from the main and auxiliary engines at different temperatures and having means for conveying feed water therethrough, and a chamber at the end of the drum adapted to receive the heated feed water and having a filter from which the feed water is adapted to be conducted to the boiler.

12. In a steam power plant of the type having a main engine and a plurality of auxiliary engines adapted to be supplied with steam from boilers, a feed water heating apparatus comprising a drum provided with a heating chamber adapted to receive steam delivered from the main and auxiliary engines and having means for conveying feed water therethrough, and a chamber at the end of the drum adapted to receive the heated feed water and having a filter at the top and a settling chamber at the bottom.

13. In a steam power plant of the type having a main engine and a plurality of auxiliary engines adapted to be supplied with steam from boilers, a feed water heating apparatus comprising a drum having two heating chambers through which steam delivered from the main and auxiliary engines is adapted to be passed and having means for conducting feed water therethrough, a settling chamber between said heating chambers, and a combined settling and filter chamber through which the feed water passes before being conducted to the boilers.

14. In a steam power plant of the type having a main engine and a plurality of auxiliary engines adapted to be supplied with steam from boilers, a feed water heating apparatus comprising a drum having two sections provided with tubes for the flow of water and adapted to have steam delivered from the main and auxiliary engines at different temperatures passed therethrough, an access and settling chamber arranged between said sections, an inlet chamber at one end of the drum to which the water to be heated is supplied, and an outlet chamber at the opposite end of the drum having settling and filtration means attached thereto.

15. In a steam power plant of the type having a main engine and a plurality of auxiliary engines adapted to be supplied with steam from boilers, a feed water heating apparatus comprising a drum having two sections provided with tubes for the flow of water and adapted to have steam delivered from the main and auxiliary engines at different temperatures passed therethrough, an access and settling chamber arranged between said sections, an inlet chamber at one end of the drum to which the water to be heated is supplied, an outlet chamber at the opposite end of the drum having settling and filtration means attached thereto, and means for passing steam under condensing conditions through one of said sections, and for passing steam through the other section under non-condensing conditions.

In testimony whereof, I hereunto affix my signature.

ALBERT J. ARMSON.